United States Patent

Watanabe

[19]

[11] Patent Number: 5,977,885
[45] Date of Patent: Nov. 2, 1999

[54] LAND VEHICLE NAVIGATION APPARATUS WITH LOCAL ROUTE GUIDANCE SELECTIVITY AND STORAGE MEDIUM THEREFOR

[75] Inventor: Kazuyuki Watanabe, Anjo, Japan

[73] Assignee: Aisin AW Co., Ltd., Japan

[21] Appl. No.: 08/921,027

[22] Filed: Aug. 29, 1997

[30] Foreign Application Priority Data

Aug. 30, 1996 [JP] Japan .................................. 8-231019

[51] Int. Cl.⁶ ................................................ G08G 1/123
[52] U.S. Cl. ........................ 340/995; 340/988; 701/208; 701/209
[58] Field of Search .................................. 340/995, 988, 340/990; 701/201, 208, 209, 210, 211

[56] References Cited

U.S. PATENT DOCUMENTS

| 4,774,672 | 9/1988 | Tsunoda et al. | 340/995 |
| 4,879,658 | 11/1989 | Takashima et al. | 340/995 |
| 5,602,740 | 2/1997 | Nishiyama | 340/995 |
| 5,652,706 | 7/1997 | Morimoto et al. | 340/995 |
| 5,754,430 | 5/1998 | Sawada | 340/995 |
| 5,793,631 | 8/1998 | Ito et al. | 340/995 |

*Primary Examiner*—Brent A. Swarthout
*Attorney, Agent, or Firm*—Lorusso & Loud

[57] ABSTRACT

Land vehicle navigation apparatus includes a present vehicle position detector, a location setter for setting a pass-through point and a destination, and a route search unit for determination of a route to the destination through the pass-through point. A judgment area setter is provided for setting, with respect to the pass-through point, a judgment area that enables the user to select whether route guidance to the pass-through point is necessary. A controller provides control of the overall system while permitting the user's selection of whether the guidance to the pass-through point is necessary when the present vehicle position is within the judgment area, thereby facilitating guidance changeover to the route segment next following the pass-through point, without need to actually enter the pass-through judgment area near the pass-through point. Also disclosed is a storage medium operatively associated with the navigation apparatus, having encoded thereon one or more programs as required for such route guidance control procedures.

9 Claims, 8 Drawing Sheets

LAND VEHICLE NAVIGATION APPARATUS WITH LOCAL ROUTE GUIDANCE SELECTIVITY AND STORAGE MEDIUM THEREFOR

BACKGROUND OF THE INVENTION

1. Field of the Invention

The present invention relates generally to mobile electronics, and more particularly to a land vehicle navigation method and apparatus for providing route guidance by setting a destination and pass-through points. The invention also relates to storage media with encoded programs for execution of routines including a pass-through point judgment.

2. Description of the Prior Art

In conventional vehicle navigation apparatus, route guidance has been performed by setting a destination, pass-through point, facility to be seen and the like via telephone input, fifty-character voice unit input, and other types of input. In such systems places and locations are registered in advance as memory locations, thereby allowing these registered locations to be later used in setting the destination and pass-through point(s).

By way of example, responsive to an input operation effected by moving a cursor to a given location (memory location) on the guidance screen of the vehicle navigation apparatus, using a remote controller or the like, a mode selection menu with destination, pass-through point, memory, and present position is displayed as shown in FIG. 10. If "memory" is selected from the menu, then a search is initiated to identify the facility nearest the cursor position and, after it is located, the facility name "ABC", is displayed along with its register number, mark, telephone number, etc. as shown in FIG. 11 whereby upon depression of a memory button, this facility will be registered as a memory location. The location as registered in this way becomes displayable in a list format; for example, a list is displayed as shown in FIG. 10, allowing this memory location to be set as a destination upon depression of a destination button, or alternatively as a pass-through point upon depression of a pass-through point button.

With a pass-through point P is set in a guidance route as shown in FIG. 12, when a vehicle travelling along a first route R1 enters the area within a circle (pass-through judgment area) of a radius r, centered on the pass-through point P, e.g. a circle measuring 50 m in radius as shown in FIG. 12A, the system assumes that the vehicle will pass through point P and switches the route segment under guidance to the first section of a second route R2. In this way, it will not be judged that the vehicle has actually passed through point P unless it enters a pass-through judgment area extremely small in size. In other words, if the vehicle leaves first route R1 without entering the pass-through judgment area as shown in FIG. 12B, the apparatus may automatically begin searching for a route reconnecting to the first route R1 for travel toward the pass-through point P. Accordingly, even when an attempt is made before the pass-through judgment area to change or modify the travel plan to guidance for the second route without passing through point P, an intended route for connection to the second route R2 will not be searched while the system continues to search for a route reconnecting to the first route R1, unless the operator performs extra operations. For example, where it is desired to switch to the guidance relating to the second route R2, the prior art system may require that a search be again executed based on selections made from the menu presented on the guidance screen.

As is apparent from the foregoing, the vehicle does not always pass through the preset pass-through point. For instance, a situation may occur wherein a certain pass-through point has been preset as a rest stop near the mid-point of travel to a destination, but the driver has changed his mind after taking a rest prior to reaching that pass-through point and wishes to go directly to the destination without stopping at the preset pass-through point. In such a situation, the prior art apparatus requires an extra or additional operations for erasing the preset path-through point and for effecting a search for a new route to the destination, which extra operations represent an increase in complexity.

SUMMARY OF THE INVENTION

It is therefore an object of the present invention to S provide an improved method and apparatus for providing route guidance for land vehicles.

It is another object of the invention to provide vehicle navigation apparatus capable, where a pass-through point is set along a guidance route, of easily switching to guidance with respect to a next route segment following that pass-through point without requiring entry into a pass-through judgment area near the pass-through point.

It is yet another object of the invention to provide an storage medium containing encoded thereon one or more programs adaptable for use in vehicle navigation systems and providing a function, where a pass-through point is set along a guidance route, of easily switching to guidance with respect to the next route segment following the pass-through point without requiring entry into a pass-through judgment area near the pass-through point.

To attain the foregoing objects, the present invention provides a vehicle navigation apparatus for tracking a present position and providing guidance along a route to a preset pass-through point and a destination, and for optimal deletion of guidance up to the pass-through point when the vehicle is within a predetermined distance from the pass-through point.

In accordance with another aspect of the invention, the vehicle navigation apparatus includes a present position detector for detecting a present position, a location entry unit or "setter" for setting a pass-through point or a target location, a route searcher for calculation of a route to the target location through the pass-through point, a judgment area setter for setting, with respect to the pass-through point as set by the location setter, a judgment area for making it possible to select whether or not guidance to the pass-through point is necessary, and a controller for providing control while permitting selection of whether or not the guidance to the pass-through point is necessary under the condition that the present position detected by the present position detector is judged to be within the judgment area.

In accordance with still another aspect of the invention, vehicle navigation apparatus includes a present position detector for detecting a present position, a location setter for setting a pass-through point or a destination, a route search device for determination of a route to the destination through the pass-through point, a judgment area setter for setting a first judgment area for use in judging whether the pass-through point as set by the location setter has been passed and a second judgment area for use in enabling selection of whether or not guidance to the pass-through point is necessary, and a control unit for providing control while enabling selection of whether or not the guidance to the pass-through point is necessary under the condition that the present position detected by the present position detector is judged to be within the second judgment area, and for providing control to output the next guidance by judging that the pass-through point was passed, responsive to a determination that the present position is within the first judgment area.

In accordance with yet another aspect of the invention, the vehicle navigation apparatus includes a present position detector for detecting present position, a location setter for setting a pass-through point and a destination, a route search device for determination of a route to the destination through the pass-through point, a judgment area setter for setting a first judgment area for use in judging whether the pass-through point, as set by the location setter, has been passed and a second judgment area encompassing and wider than the first judgment area, and a control device for providing control while allowing a vehicle operator to selectively designate whether or not the guidance to the pass-through point is to be provided, under the condition that the present position detected by the present position detector is within the second judgment area and is off of the determined route, and for providing guidance for the next road segment, responsive to a judgement that the pass-through point has been passed and that the present position is within the first judgment area.

In accordance with a further aspect of the invention, the control device controls the route search device so as to search for a new route while erasing the pass-through point as presently set responsive to an instruction that guidance to the preset pass-through point is no longer necessary.

In accordance with a still further aspect of the invention, a storage medium is provided encoded with a program for tracking a present position and providing guidance by determining a route to a predetermined pass-through point and a destination. The storage medium stores therein a program which receives a pass-through point and a destination by location setting, sets a judgment area for allowing a vehicle operator to selectively designate whether or not guidance to the pass-through point set as a location is necessary, and provides control while enabling selective designation of whether or not the guidance to the pass-through point is still necessary when the present position is judged to be within the judgment area.

In accordance with a yet further aspect of the invention, a storage medium has encoded therein a program for tracking a present position and providing guidance by determining a route to a predetermined pass-through point and a destination. The encoded program includes a function of storing a pass-through point or a destination through location setting, a function setting a first judgment area for use in judging whether the pass-through point as set through the location setting has been passed and a second judgment area for use in enabling selection of whether or not guidance to the pass-through point is still required. The program controls operation of the navigation system while enabling selection of whether or not guidance to the pass-through point is necessary, under the condition that the present position is judged to be within the second judgment area, and provides guidance for travel beyond the pass-through point responsive to a judgement that the pass-through point has been passed and to a determination that the present position is within the first judgment area.

These and other objects, features and advantages of the invention will be apparent from the following more detailed description of preferred embodiments of the invention, as illustrated in the accompanying drawings.

BRIEF DESCRIPTION OF THE DRAWINGS

FIGS. 2A, 2B, 2C, 2D and 2E, is a diagram of a road data file as employed in the apparatus of FIG. 1;

DETAILED DESCRIPTION OF THE INVENTION

Figure 1:
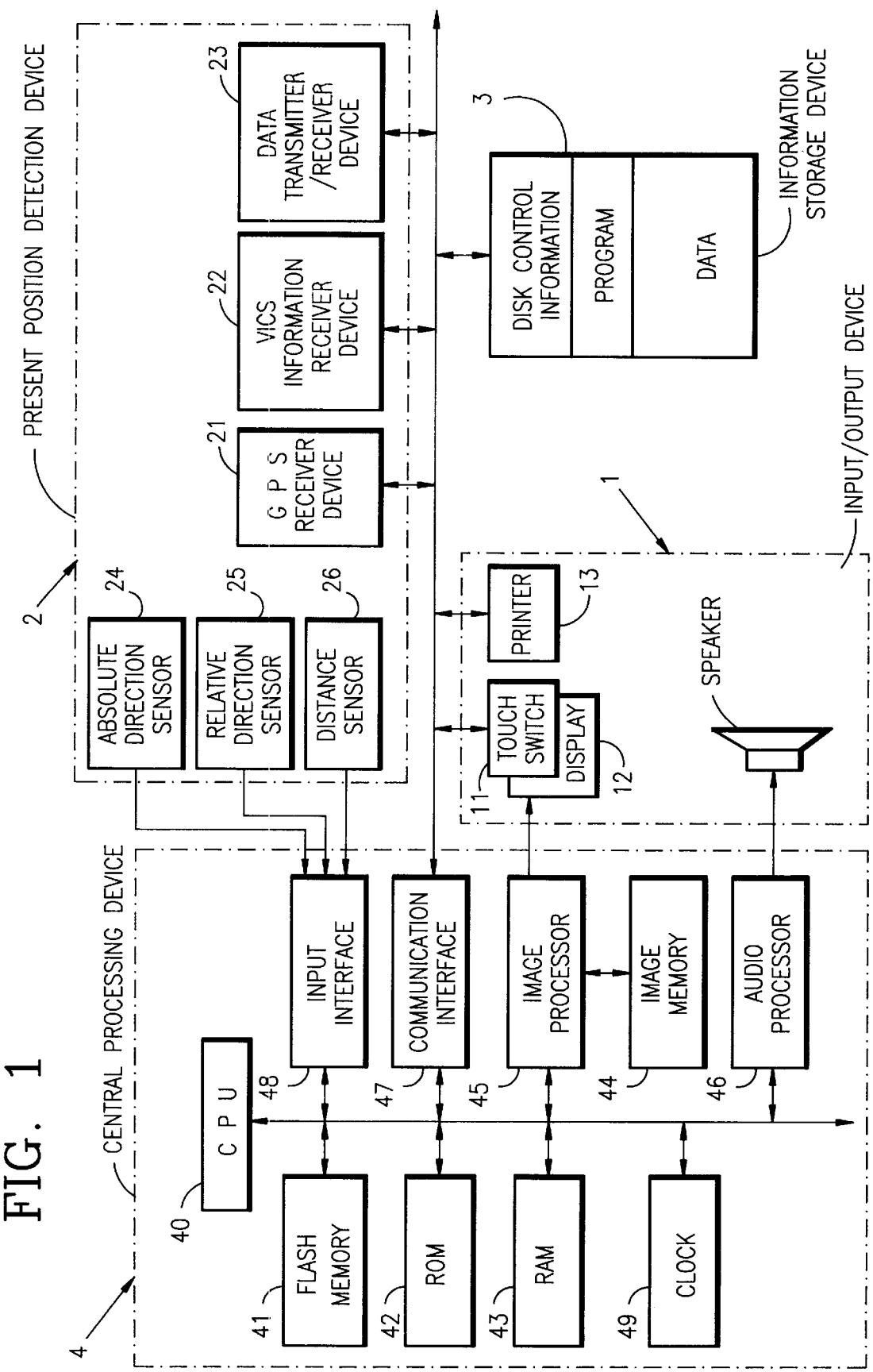
FIG. 1 is a block diagram of one embodiment of navigation apparatus hardware of the present invention.

Referring to FIG. 1, a land vehicle navigation apparatus in accordance with one preferred embodiment of the present invention is shown as including an input/output (I/O) device 1 for inputting and outputting information as to route guidance, a present position detector 2 for detecting information concerning the present location of a vehicle, an information storage device 3 which contains stored therein navigation data required for determination of routes, display/audio guidance data necessary for route guidance, programs (applications and/or OS) and the like, and a central processing device 4 which executes display/audio guidance routines and routines for route searching and route guidance and which also provides control over the entire system.

The I/O device 1 provides instructions to the central processor 4 in conformity with the vehicle operator's will and prints out processed data. Thus, the input/output device 1 allows input of a target place or destination and output of guidance information via audio and/or display when required by the operator. As means for providing such functions, the input section of device 1 has a touch switch 11 and operation switches for input of a destination, based on the telephone number or map coordinates thereof, as well as for request of route guidance. Alternatively, the input section of device 1 may be a remote controller or the like.

The output section of device 1 includes a display unit 12 which displays input data and also automatically displays route guidance as graphics images on the screen, upon reception of a request from the vehicle operator, a printer 13 which produces hard copies of data as processed by the central processor 4 and data as stored in the information storage device 3, and a speaker 16 for output of resultant route guidance by voice.

A voice recognition device may be added to enable voice input and a record card reader may be added for reading data recorded on IC cards or magnetic cards. The apparatus may also include a data communication device for data communications between the navigation apparatus and remote information sources such as an information center which stores data necessary for navigation and which provides information via communication lines responsive to the operator's request, and an electronic personal information management device prestoring data specific to the operator such as map data, destination data and the like.

The display unit 12 is a color CRT or color liquid crystal display panel, for color display of all the output screens necessary for navigation including a route setting screen, a route segment drawing screen, intersection drawing screens and the like based on map data and guidance data processed by the central processor 4. The display unit 12 also displays buttons on a screen for use in performing operations such as setting route guidance and changing guidance and screens during route guidance. In particular, pass-through intersection information such as the name or title of an intersection to be passed through will be color-displayed on the route-segment drawing screen, in a pop-up manner, at any time as required.

The display unit 12 is mounted within the instrument panel near the operator's seat, thus enabling the operator (driver) to confirm the present location of his or her vehicle by viewing a road-segment screen, while acquiring therefrom information as to the route ahead. The display unit 12 is also provided with a touch switch 11 corresponding to the function button display, and is thus arranged so that the aforementioned operations may be effected by touch of an appropriate button. An input signal generator such as a button, a touch switch or the like constitutes the input section.

The present position detector 2 includes a global positioning system (GPS) receiver 21 for acquiring information, e.g. a commercially available GPS for vehicles. The detector 2 also includes a vehicle information communication system (VICS) data receiver 22 for acquiring information by use of FM multiple broadcasts, radio wave beacon signals, optical beacon signals, and equivalents thereof. A data transmitter/receiver 23 is provided for bidirectionally communicating—by use of a mobile telephone set, personal computer, or the like—information with the information center (ATIS, for example) and with other vehicles. Detector unit 2 includes an absolute direction sensor 24 for detecting the absolute travelling direction of the vehicle by utilizing geomagnetism, a relative direction sensor 25 for detection of the vehicle's relative travelling direction by use of a steering sensor or gyro sensor, and a distance sensor 26 for detection of the travelled distance of the vehicle based on monitoring of the number of rotations of a shaft. Detector 2 operates to transmit and/or receive road information and traffic information concerning the vehicle's travel and to detect information as to the present vehicle position and further to transmit and receive information pertaining to the present position.

The information storage unit 3 is an external large-capacity memory device which stores therein programs and data for navigation, and may be a compact disc read only memory (CD-ROM). The programs may include a program for route searching, a program for making a pass-through judgment as to a pass-through point, as will be described later, a program for selectively designating whether or not guidance to the pass-through point is necessary, a processing program as will be later explained in connection with a flowchart of one embodiment, a program for display output control for visual guidance and voice output control for voice guidance, as well as associated data. The storage device 3 further stores display information data required for route guidance and map display. Such stored data will include all of the data necessary for operation of the navigation apparatus, which will typically consist of several kinds of data files such as map data, search data, guidance data, map-matching data, destination data, registered location data and the like. Note that the present invention may also be embodied in an apparatus of the type wherein a CD-ROM is employed for storage of data only, with the programs being stored in the central processor 4.

The central processor 4 includes a CPU 40 for performing a variety of arithmetic processing tasks, a "flash" electrically erasable programmable read only memory (EEPROM) 41 for reading programs out of the CD-ROM of the storage unit 3 and storing the same therein, a read-only memory (ROM) 42 for storage of a program for executing program-check and update of the flash memory 41 (program loader), a random access memory (RAM) 43 for temporarily storing therein searched route guidance information such as the point coordinates of a presently set destination, road name code No. and the like along with data to be subjected to arithmetic processing, an image memory 44 such as a video RAM (VRAM) for storage of image data to be used for screen display, an image processor 45 which retrieves image data from the image memory 44 on the basis of a display output control signal from the CPU 40, processes the retrieved image data and outputs the result to the display, and an audio processor 46 which synthesizes an audible sound, e.g. a voice, a phrase or sentence with a single message, a simple sound or the like, based on data read from storage unit 3 in response to receipt of an audio output control signal from CPU 40. The audio processor 46 thus produces a synthesized signal and converts that synthesized signal into an analog signal that is output to the speaker 16. The central processing device 4 is further equipped with a communication interface 47 for handling I/O data over communication channels, a sensor input interface 48 for receiving sensor signals from the present position detector 2, a clock 49 for writing date and time into internal dialog information, and other signals. Thus, the present embodiment provides route guidance both by screen display and by audible output while allowing the driver to delete either.

It should be noted that the aforementioned program for update processing may alternatively be stored in the external storage device. All of the programs in accordance with the present invention as well as the other programs required for performing navigation may be stored in the CD-ROM which is an external storage medium; alternatively, part or all of such programs may be stored internally in the ROM 42.

A variety of navigation functions may be attained by performing arithmetic procedures in such a way that the data and programs stored in the external storage medium are input as external signals to the central processor and implemented within the main body of the navigation apparatus.

The navigation apparatus embodying the present invention includes a relatively large capacity flash memory 41 for reading certain program(s) out of the CD-ROM, an external storage device as described previously, and a small capacity ROM 42 which prestores therein a program (program loader) for start-up processing of a CD. The flash memory 41 is a memory which retains therein once-stored information even after interruption of power supply thereto. In other words, flash memory 41 is a nonvolatile memory. CD start-up processing is a function of a certain program stored in the ROM 42 acting as the program read-in means, which program starts by checking the program stored in the flash memory 41 while reading disk control information and the like from the CD-ROM of the information storage unit 3. The program loading (update processing) is carried out by judgment based on this information and the status of the flash memory 41.

Figure 2:
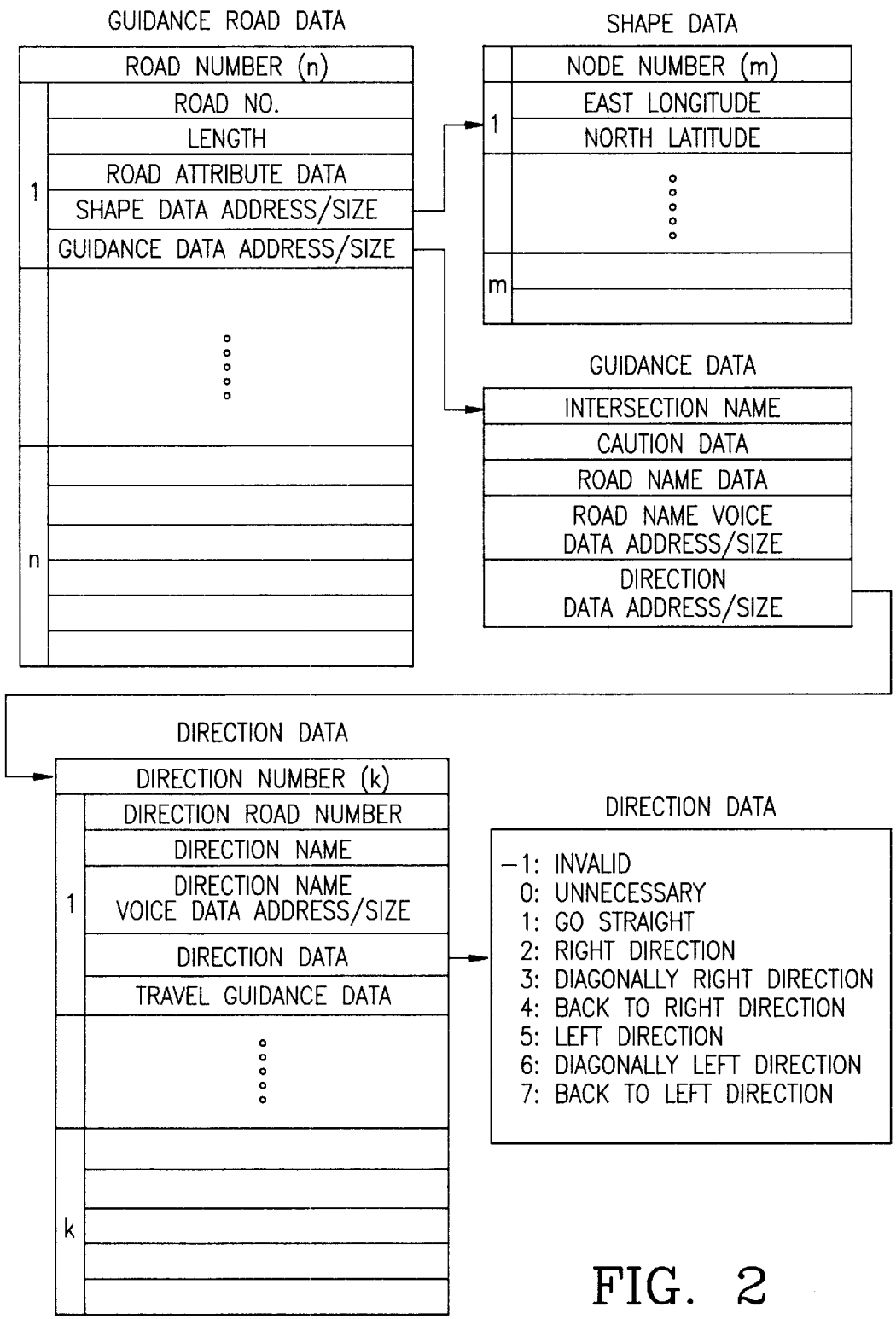
FIG. 2, including

FIGS. 2A–2D show one example of the configuration of the main data files as stored in the CD-ROM 3. As shown in FIG. 2A, a guidance road data file contains data items necessary for determination of a route or routes by the route calculation device and for performing route guidance. The data for each of the roads of number n consists of a road number, road length, road attributes, address and size of shape data, and address and size of guidance data. The road number is set, independently of the direction of travel (outbound or return), for each road segment between branch points. The shape data may include, as shown in FIG. 2B, coordinate data, e.g. east longitude and north latitude, for each of the nodes of number m when each road is divided by a plurality of nodes (sectioned).

As shown in FIG. 2C, the foregoing guidance data may consist of an intersection (or branch point) name, caution data, road name data, road name voice data address/size, and course data address/size.

As shown in FIG. 2D, the data for a road connecting to the road of FIG. 2A may consist of a road number, road name or title, road name voice data address/size, road direction data, and travel guidance data. The connecting road name may also include a district name. Also, the course direction data may be data indicating invalidity (no use of the road direction data), lack of guidance availability, and several direction information items such as go straight, turn right, turn diagonally right, turn back to the right, turn left, turn diagonally left, and turn back to the left.

Figures 3, 4:
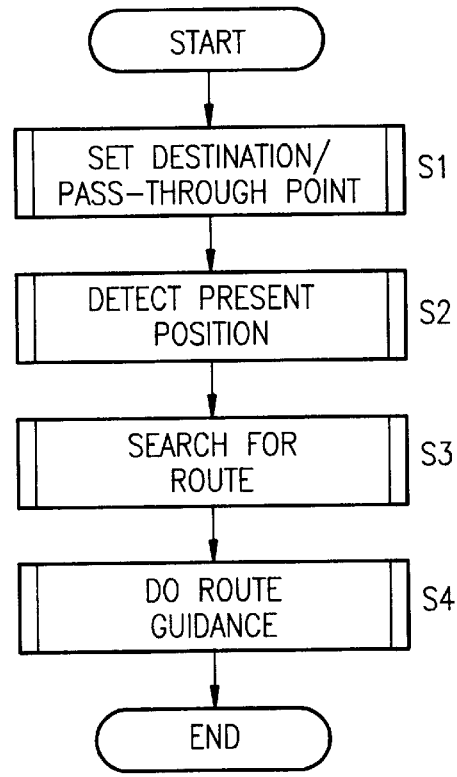
FIG. 3 is a flow chart of a main routine executed by the vehicle navigation apparatus of FIG. 1 in accordance with the present invention.
FIG. 4 is a diagram of a registered location data file.

As shown in FIG. 3, when a program(s) is/are read out of the storage unit 3 into the CPU 40 of the central processor 4, the program for route guidance is started. A destination is set by input of a destination name such as a place name, facility name or the like, telephone number, administrative address, registered point, road name and the like (step S1). Next, the present position detector 2 detects the present position for display on a map of the immediate vicinity with the detected present position being at its center, while simultaneously displaying the name of the present position and other appropriate guidance information (step S2). Then, a route search is performed for an area ranging from the present position to the destination (step S3). Once the route is determined, route guidance and display for successive road segments, intersections, etc. (on the determined route) will be recurrently performed until the vehicle actually arrives at the destination, while the present position detector 2 continues to track the present position (step S4). Where an input of a temporary "stop-and-stay point" setting is made before arrival at the destination, a search area is set for performing another search or "re-search" within the set search area so that similar route guidance is provided until arrival at the destination.

FIG. 4 depicts a registered location data structure. As shown in FIG. 4, the registered location data may include the coordinates of each registered location point, registered point name data, registered point address, road number for the road which the registered point faces, and the like. The registered point name data may involve pronunciation of the registered point names in order to enable input of fifty voice units. The data may allow for display of a registered point list, in any language, during search procedures, e.g. in English (Arabic alphabet), Chinese KANJI, Japanese KATAKANA or equivalents thereof. The registered point address data may contain, for each registered point's location its state or prefecture, city, town and the like in a local hierarchical structure.

Operation of the vehicle navigation apparatus of the present invention, including the pass-through point judgment, will now be described in conjunction with FIGS. 5–10. Note that FIG. 5 serves to explain the pass-through point judgment procedure of the present invention. Note also that all pass-through points and the destination are input by the location setting method shown in FIG. 10.

Figure 5:
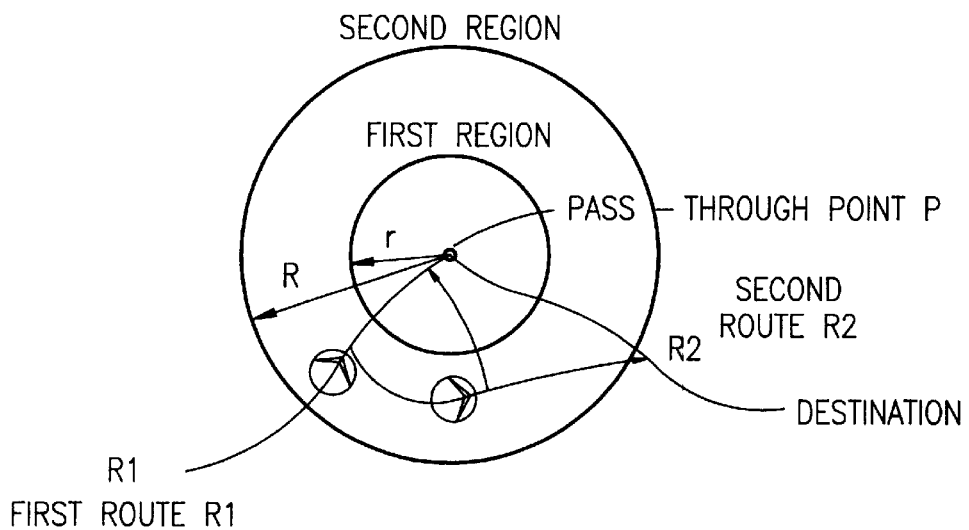
FIG. 5 is a diagram illustrating pass-through point judgement in accordance with the present invention.
Figure 12A:
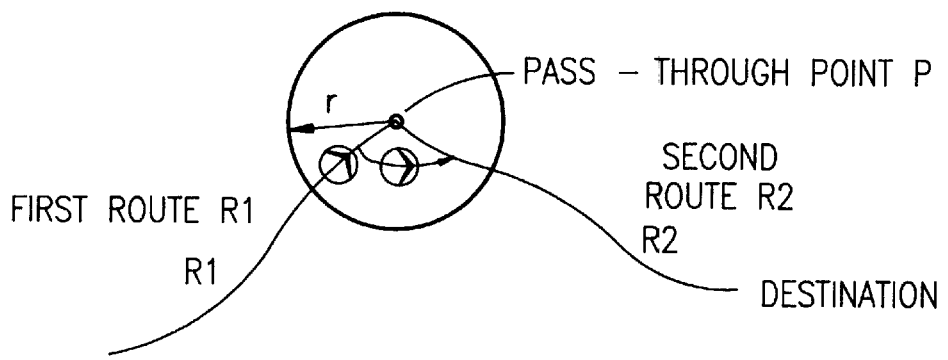
FIG. 12A is a diagram illustrating pass-through point judgment in accordance with the prior art where the vehicle has deviated from a route R1 after having entered a verification area.
Figure 12B:
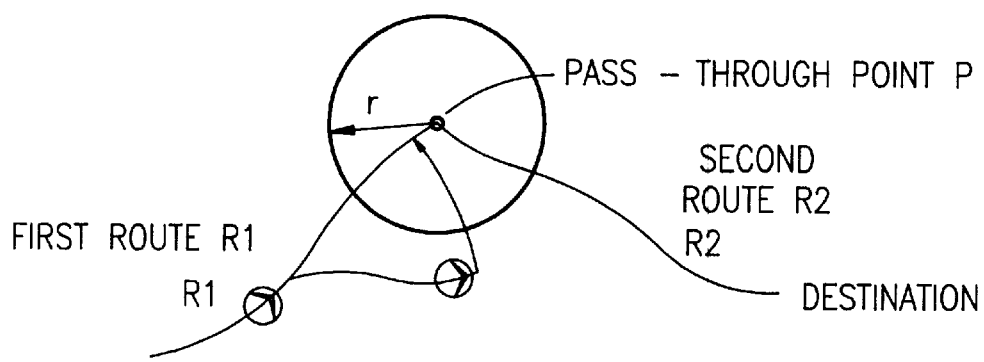
FIG. 12B is a diagram illustrating operation of a prior art system in a case where the vehicle has deviated from route R1 before entering the pass-through judgement verification area.

As shown in FIG. 5, when a pass-through point P is set along a guidance route with a route portion to the pass-through point being represented as a first route R1 and with a route portion extending beyond the pass-through point being represented as a second route R2, the inside of a circle (first region) of radius r with the point P as its center defines a pass-through judgment area and the inside of a circle (second region) of radius R (R>r, by several hundred meters to several kilometers, for example), also with the point P as its center, defines a pass-through judgment verify area. Thus, the first region is the pass-through judgment area as explained in connection with FIG. 12 and when the vehicle enters this area, or alternatively, when it leaves the first route after entering this area, it is to be determined that the vehicle has passed through the pass-through point P. The second region is a pass-through judgment verify area as set in the present invention. When the vehicle enters this area or when it leaves the first route after entering this area, a message "CHANGE TO GUIDANCE TO NEXT POINT?" is first displayed. Next, when a button is depressed or an equivalent remote operation is executed to input an affirmative answer, it is judged that the vehicle has penetrated the pass-through point P so that a connection route to the second route R2 is then searched for while changing to guidance to the second route. In cases where such guidance change to the second route is not selected, a route coupled to the first route R1 is searched for allowing guidance based on the same to be carried out. In other words, when the vehicle enters the pass-through judgment verify area, it is possible by operation of a single switch—without need for complicated operations such as turning back to the menu screen for performing a re-search as has been required in the prior art—to select one of the following two options: turning back to the first route, or going to the second route with the pass-through point being bypassed.

Figure 6:
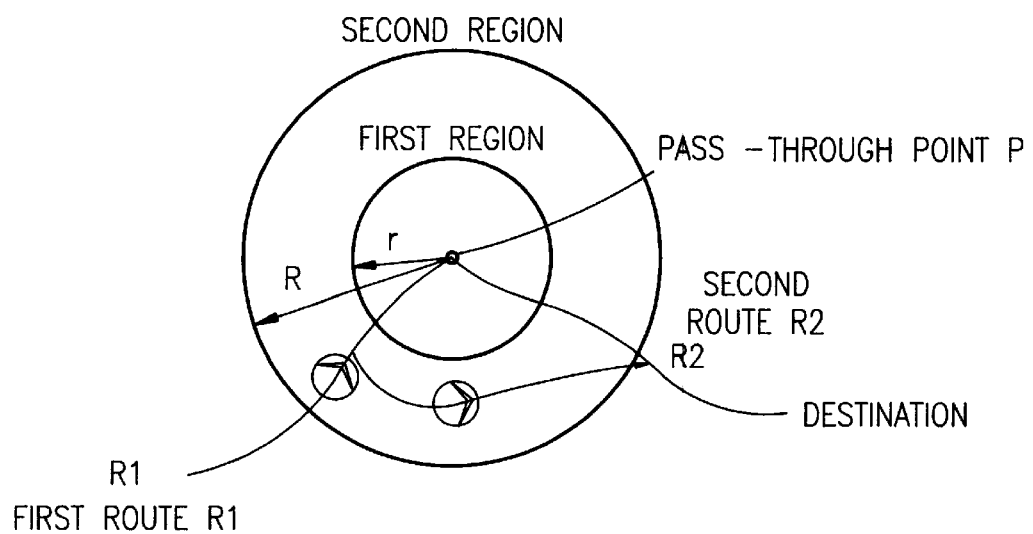
FIG. 6 is a diagram illustrating a vehicle within a pass-through judgement verification area and traveling toward a second route with bypass of the pass-through point.

FIG. 6 illustrates election of the second option, i.e. the case where the vehicle travels directly to the second route without passing through the pass-through point P. When the vehicle enters the second region or, alternatively, when it enters the second region and then leaves the first route R1, the above-mentioned message "CHANGE TO GUIDANCE TO NEXT POINT?" is displayed. Here, when a guidance change is selected by switch operation, a route connecting to the second route is searched and further guidance is determined by the search results.

Figure 7:
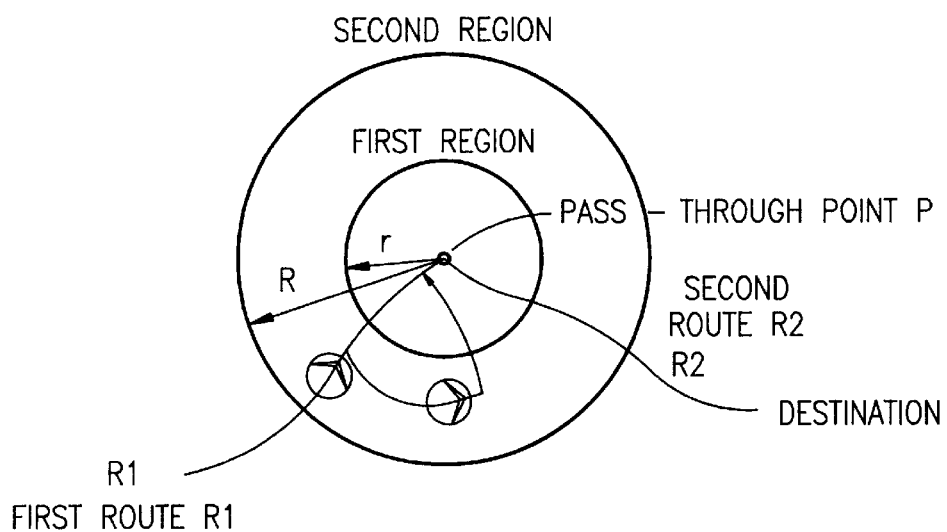
FIG. 7 is a diagram of a vehicle which has entered the pass-through judgement verification area, has deviated from a first route and is returning to the first route.

FIG. 7 illustrates the case where the vehicle has departed from the first route R1 after entering to the second region, and is attempting to return at the original route. As shown, when the vehicle leaves the first route R1 after entering the pass-through judgment verify area, the message "CHANGE TO GUIDANCE TO NEXT POINT?" is displayed. When a switch is operated to select that such a guidance change is not to be executed, a route coupled to (for the return to) the first route R1 is searched and guidance is performed based on such search results.

Figure 8:
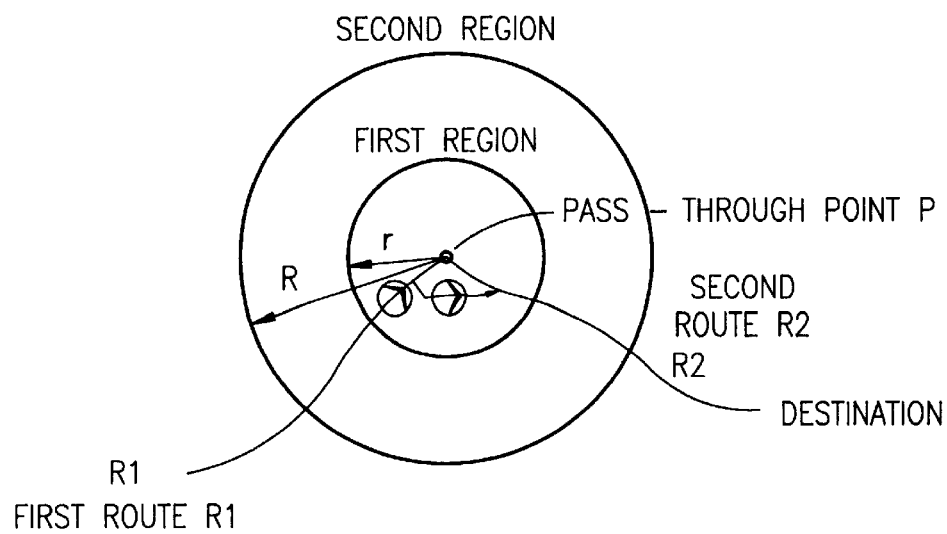
FIG. 8 is a diagram of a case where the vehicle has entered a first verification region, after having passing through a second verification region, and has then deviated from a first route R1.

FIG. 8 illustrates the case where the vehicle has passed through the second region and then entered the first region. As illustrated, when the vehicle enters the inside the pass-through judgment verify area, or alternatively, when it enters the pass-through judgment area and is off of the route R1, it is judged that it has penetrated the pass-through point P causing guidance to be switched to that for the next road segment (second route R2).

Figure 9:
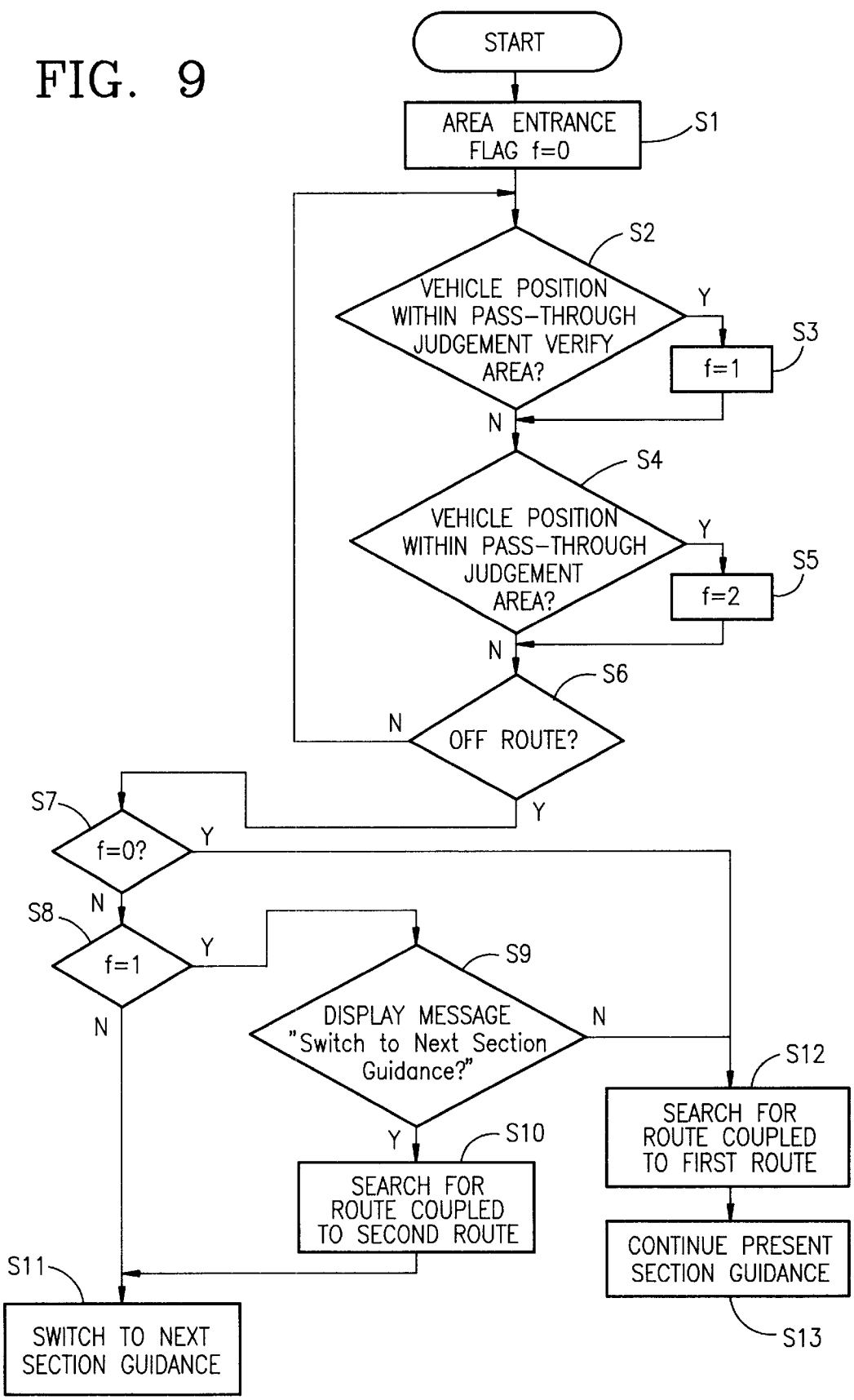
FIG. 9 is a flow chart of a pass-through point judgment routine in accordance with the present invention.
Figure 10:
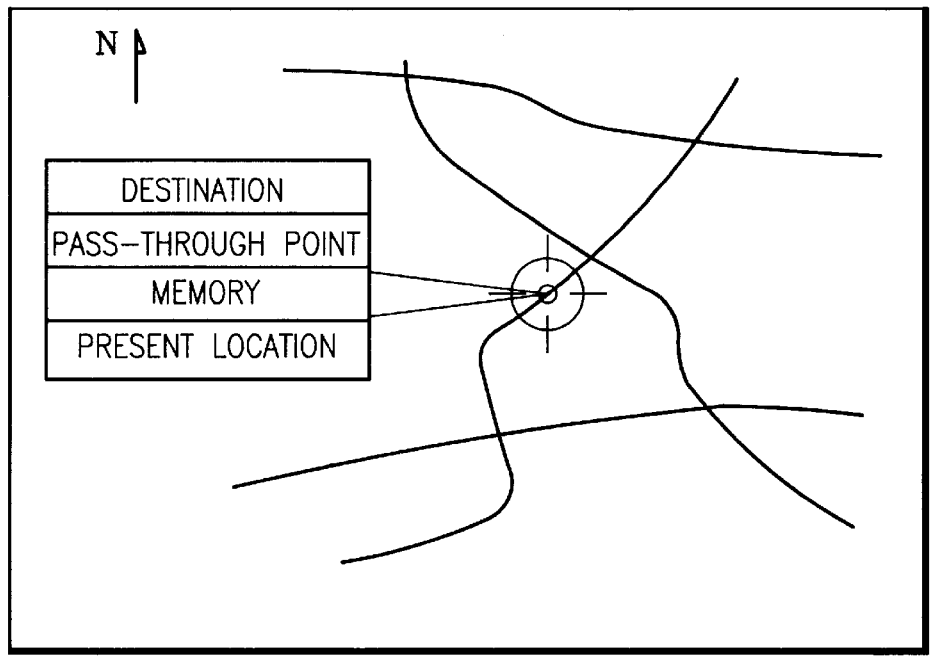
FIG. 10 is a diagram showing a guidance screen displaying a mode selection menu.
Figure 11:
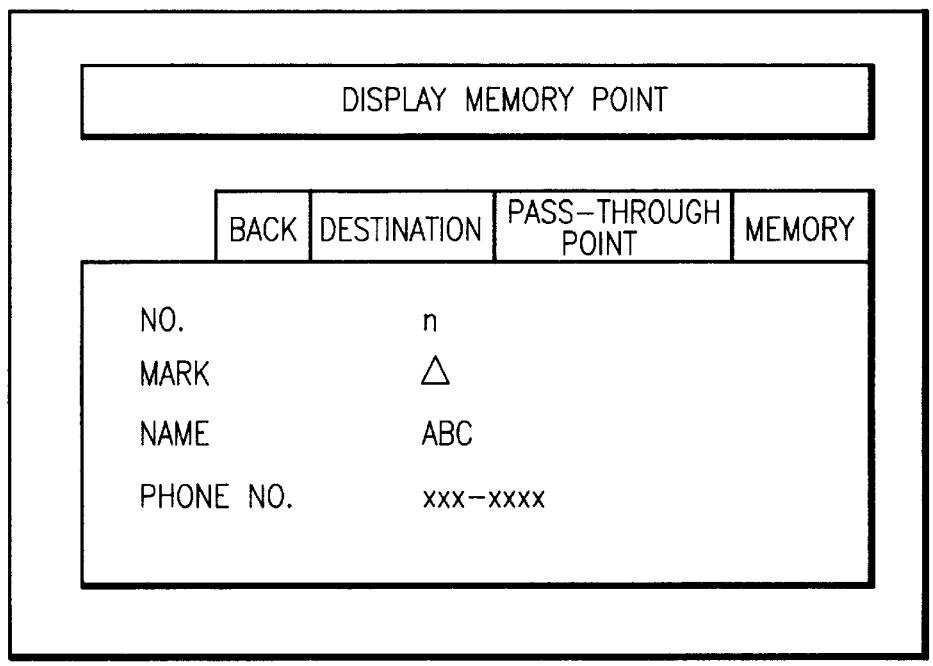
FIG. 11 is a diagram showing a display screen displaying a memory point.

FIG. 9 illustrates the pass-through judgment of the present invention, wherein an area intrusion flag f indicates whether or not the vehicle has entered the pass-through judgment area or the pass-through judgment verify area. Pass-through judgment and message display of guidance change to that for the next road segment are made in view of the area intrusion flag f.

As shown in FIG. 9, when the route guidance is started, the area intrusion flag f is set at 0 (step S1). The present position detector 2 of FIG. 1 detects the present vehicle position. If the present vehicle position is within the pass-through judgment verify area (second region) then the area intrusion flag is set to 1, i.e. f=1 (step S2Y, step S3). After further travel of the vehicle, when it is detected that the present vehicle position is within the pass-through judgment area (first region), the area intrusion flag is set to 2, i.e. f=2 (step S4Y, step S5). If the vehicle does not reach the pass-through judgment verify area, then the area intrusion flag remains as f=0. Next, it is determined whether or not the vehicle is off-route (off of the first guidance route R1 leading to the pass-through point) (step S6). If not off of the first guidance route R1 (step S6N) then the prescribed routine steps will be repeated; if the vehicle is detected to be off of route R1 and at the same time the area intrusion flag is f=0, then a search is performed to find a route coupled to the first guidance route (for return to the first route) (step S6Y, step S7Y, step S12). If off of the first guidance route R1 and simultaneously the area intrusion flag is f≠0 and f=1 (step S6Y, step S7N, step S8Y), this means that the vehicle is off-route within the pass-through judgment verify area and, accordingly, the message "CHANGE TO GUIDANCE TO NEXT SECTION?" is displayed (alternatively, the same is audibly issued, or the screen and voice notification may be used at the same time). When a switch is operated to select a change of guidance to the next road segment (step S9Y), a route search is made to find a route connecting to the second guidance route R2 with the pass-through point being its starting point (step S10) and guidance is changed to that for the next road segment R2 (step S11). Where change to such next-section guidance is not selected by switch operation (step S9N), a search is carried out to find a route for return to the first guidance route, thus allowing guidance to be continued with respect to the first road segment (step S12, step S13). If f≠1, namely, f=2 at the step 8, then the vehicle is off-route within the pass-through judgment area. Therefore, it is judged that the vehicle has passed through the pass-through point causing guidance to be changed to that for the next road segment (next section map) (step S8N, step S11).

It should be noted that, while execution of the routine of FIG. 9 uses off-route as a criterion in step 6, this off-route criterion may be eliminated and the steps following S6 performed with the vehicle's entrance to the pass-through judgment area or the pass-through judgment verify area being used as criteria.

As has been described above, according to the present invention, a separate pass-through judgment verify area is set significantly larger than and surrounding a pass-through judgment area, thus making it possible, where a vehicle has entered the pass-through judgment verify area, to easily select whether or not guidance for travel through the pass-through point is to be provided, without need for actually entering the pass-through judgment area, which in turn enables a travel plan change or modification with elimination of travel through such pass-through point.

The entire disclosure of Japanese Patent Application No. 8-231019 filed on Aug. 30, 1996, including specification, claims and drawings, is incorporated herein by reference.

While the invention has been described with reference to preferred embodiments, the foregoing embodiments are merely illustrative of the invention and should not be construed as limiting the invention. Various modifications and applications may be adopted by those skilled in the art without departing from the true spirit and scope of the invention as defined by the appended claims.

What is claimed is:

1. A vehicle navigation apparatus comprising:
   a present position detector for detecting present position of the vehicle;
   location input means for setting at least one of a pass-through point and a destination;
   route search means for determination of a route to the destination through the pass-through point;
   guidance output means for outputting guidance pertaining to successive segments of the determined route;
   judgment area entry means for setting a first judgment area surrounding the pass-through point and a second judgment area larger than and surrounding the first judgment area;
   control means for determining if the detected present position is within the first or second judgment areas, for switching guidance output to guidance for the next segment in succession responsive to a determination that the detected present position is within the first judgment area, and for generating a prompt through said guidance output means allowing selection of whether or not guidance to the pass-through point is to be provided responsive to a determination that the detected present position is within the second judgment area; and
   input means for making the selection, responsive to the prompt.

2. The apparatus according to claim 1, wherein said control means controls said route search means so as to search for a new route to erase the pass-through point as presently set responsive to selection that guidance to the pass-through point is not to be provided.

3. The apparatus according to claim 1 wherein said first and second judgement areas are centered on said pass-through point.

4. A vehicle navigation apparatus comprising:
   a present position detector for detecting present position of the vehicle;
   location input means for setting at least one of a pass-through point and a destination;
   route search means for determination of a route to the destination through the pass-through point;

guidance output means for outputting guidance pertaining to successive segments of the determined route;

judgment area entry means for setting a first judgment area surrounding the set pass-through point and for setting a second judgment area larger than and surrounding the first judgment area; and control means for determining if the detected present position is within the first or second judgment areas, for switching guidance output to guidance for the next segment in succession responsive to a determination that the detected present position is within the first judgment area and for generating a prompt through said guidance output means for allowing selection of whether of not guidance to the pass-through point is to be provided, responsive to a determination that the detected present position is within said second judgment area and off of the determined route; and input means for making the selection, responsive to the prompt.

5. The apparatus according to claim 4, wherein said control means controls said route search means so as to search for a new route and to erase the pass-through point as presently set responsive to selection that guidance to the pass-through point is not to be provided.

6. The apparatus according to claim 4 wherein said first and second judgement areas are centered on said pass-through point.

7. A storage medium having encoded thereon a program for tracking a present position of a vehicle and providing guidance by determination of a route through a predetermined pass-through point to a destination, said program defining a routine comprising the steps of:

receiving input of locations of the pass-through point and the destination;

searching to determine a route to the destination through the pass-through point;

outputting guidance pertaining to successive segments of the determined route;

setting a first judgment area surrounding the pass-through point and a second judgment area larger than and surrounding the first judgment area;

determining whether or not the detected present position is within the first or second judgment area;

switching guidance output to guidance for the next segment in succession responsive to a determination that the detected present position is within the first judgment area;

generating a prompt through guidance output means allowing selection of whether or not guidance to the pass-through point is to be provided, responsive to a determination that the detected present position is within the second judgment area;

receiving said selection, responsive to the prompt; and outputting guidance to the pass-through point responsive to selection of guidance to the pass-through point.

8. The storage medium according to claim 7 wherein said first and second judgement areas are centered on said pass-through point.

9. The storage medium of claim 7 in the form of a CD-ROM.

* * * * *